2,757,172
MONOAZO DYESTUFFS CONTAINING HEAVY METAL

Guido Schetty and Werner Kuster, Basel, Switzerland, assignors to J. R. Geigy A. G., Basel, Switzerland, a Swiss firm No Drawing. Application July 6, 1953,
Serial No. 366,387

Claims priority, application Switzerland July 16, 1952

7 Claims. (Cl. 260—147)

The present process concerns the production of metallisable monoazo dyestuffs and their complex heavy metal compounds. Chromium and cobalt containing monoazo dyestuffs are described for example in U. S. Patent No. 2,551,056. These dystuffs are soluble in water and are suitable for the dyeing of wool and polyamide fibers although they do not contain any acid water solubilising groups such as the sulphonic acid or carboxylic group apart from a carboxyl group which may be present in the complex formation.

On further development of this subject, it has been found that new, valuable azo dyestuffs can be obtained if a diazotised amino compound of the aromatic series containing a substituent capable of forming the metal complex or one which can be converted into such a substituent, is coupled with an azo component coupling in the ortho position to a hydroxyl group, the components being so chosen that there is at least one aromatically bound chloromethyl-sulphonyl group in the azo dyestuff obtained. All the aromatic rings of the dyestuffs can contain the usual non-ionogenic substituents provided that they do not contain any acid water solubilising groups, insofar as these do not participate in the complex formation. The new azo dyestuffs, either as such and also in the form of their complex heavy metal compounds are sufficiently water soluable for dyeing purposes and have excellent drawing power onto wool and natural and synthetic fibers similar thereto.

These new dyestuffs of the general formula:

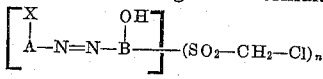

wherein:

A represents the radical of a diazo component,
B represents the radical of a coupling component coupling in the o-position to the hydroxyl group,
X represents a hydroxyl or carboxyl group in the o-position to the azo group or substituents which can be converted thereto under the metallising conditions, and
$n$ represents the numbers 1 and 2, wherein the chloromethyl-sulphonyl group is aromatically bound and A and B can contain further non-ionogenic substituents, can be converted into valuable complex heavy metal compounds either by the single bath chroming method from a neutral to weakly acid bath with alkali metal chromates on the wool or in substance with heavy metal compounds, in particular with those of trivalent chromium and of cobalt. The new complex chromium compounds produced in substance are distinguished from those of U. S. Patent No. 2,551,056 by an improved drawing power on to wool from a neutral to weakly acid bath.

The chloromethyl-sulphonyl groups characteristic of the new dyestuffs can be either in the diazo or the azo component or in both simultaneously. They are introduced into the intermediate product, e. g. by reacting sulphinic acids with dichloroacetic acid while decarboxylising. Suitable coupling components are obtained for example from 3- or 4-chloromethyl-sulphonyl-1-amino-benzenes by reacting with diketene whereby corresponding acetoacetic acid aryl amides are formed, or by diazotisation, reduction of the diazo group to the hydrazine group and reacting with acyl acetic acid esters whereby corresponding 1-phenyl-5-pyrazolones are obtained. 3- or 4-chloromethyl-sulphonyl-1-acetoacetylamino-benzene, 3 - chloromethyl - sulphonyl - 6 - chloro - or 6 - methoxy - 1 - aceto - acetylamino - benzene, 1 - (3' - or - 4'-chloromethyl - sulphonyl - phenyl) - 3 - methyl - or -phenyl- or -carbalkoxy- or -carbamido-, -carbobutylamido- or -carbodiethylamido-5-pyrazolone can be used for example.

The dyestuffs with only one chloromethyl-sulphonyl group, this group being preferably in the diazo component, in particular the derivatives of 4-chloromethyl-sulphonyl-2-amino-1-hydroxy-benzene compounds, are more valuable. Diazo components which can be used are for example 4 - chloromethyl - sulphonyl - 2 - aminobenzene-1-carboxylic acid, 4-chloromethyl-sulphonyl-2-amino-1-hyroxy-benzene, 6-chloro- or 6-nitro-, 6-acetylamino- or 6 - carbethoxy - amino - 4 - chloromethyl - sulphonyl - 2- amino-1-hydroxybenzene and also the corresponding 1-alkoxy- or 1-halogen compounds. As diazo and coupling components without the characteristic chloromethyl sulphonyl group, those usual in the production of metallisable azo dyestuffs can be used insofar as they contain no acid water solubilising groups not participating in the metallising process. o-Amino-benzoic and -naphthoic acids, o-amino-phenols, o-halogen- or alkoxy-anilines, o-aminonaphthols can be used as diazo components for example. As coupling components can be used for example phenols coupling in the o-position to an enolic or phenolic hydroxyl group, naphthols, acyl-aceto-arylamides, pyrazolones, etc. All these components can be further substituted non-ionogenically, for example by halogen, alkyl, alkoxy, aryloxy, nitro, acyl-amino, alkyl- or aryl-sulphonyl, sulphonic acid amide, -alkylamide, -dialkylamide, -arylalkylamide or -arylamide groups.

The new dyestuffs in substance can be metallised in aqueous solution or suspension on heating, open or under pressure, by the action of agents giving off metal, preferably of compounds of trivalent chromium or of cobalt. It is advantageous to use water soluble salts such as cobalt nitrate, cobalt sulphate, cobalt acetate, if necessary in the presence of mineral acid neutralising agents such as alkali acetates for the cobalting. Chroming is performed advantageously with the complex salts of trivalent chromium, for this purpose the soluble alkali salts of chromosalicylic acid are particularly advantageous. The heavy metal compounds are applied in such amounts that there are two dyestuff molecules to at least 1 metal atom. If necessary, the particularly valuable chromium and cobalt complexes of the new dyestuffs can be mixed with salts having an alkaline reaction such as sodium carbonate or trisodium phosphate and with wetting and dispersing agents to improve the water solubility of the new dyestuff complexes. They dye wool, silk, polyamide, polyurethane and casein fibers, leather, feathers and similar protein materials from even a neutral to weakly acid bath in fast to light yellow, orange, brown, red, violet to grey shades dependent on the composition of the dyestuff.

The following examples illustrate the invention without limiting it in any way. Where not otherwise stated, parts are given as parts by weight and the temperatures are in degrees centrigrade. The relationship of parts by weight to parts by volume is as that of kilogrammes to litres.

Example 1

25 parts of 2-aminobenzoic acid-4-chloromethyl sulphone and 6.5 parts of anhydrous soda are dissolved at 60° with a weakly alkaline reaction to litmus paper in 200 parts of water, 100 parts by volume of N-sodium nitrite are added and the whole is cooled to 20°. This solution is added dropwise while stirring at 3–5° to a mixture of 30 parts of concentrated hydrochloric acid and 100 parts of water. On completion of diazotisation, a solution of 21.9 parts of 1-(3'-chlorophenyl)-3-methyl-pyrazolone in 100 parts of water and 120 parts by volume of N-caustic soda lye are added dropwise. The coupling commences immediately and is completed within one hour by the addition of a little soda solution until there is a phenolthalein alkaline reaction. To isolate the dyestuff, the reaction mixture is heated to 70°, 100 parts of sodium chloride are added and after half an hour at 40° the dyestuff is filtered off.

The dyestuff is a yellow powder which dissolves in hot water with a yellow colour and dyes wool according to the single bath chroming method a reddish yellow colour. The dyeings are distinguished by very good wet and light fastness properties.

Dyestuffs with similar properties are obtained if in the above example, the coupling component is replaced by 21.9 parts of 1-(4'-chlorophenyl)-3-methyl-pyrazolone, 20 parts of 1-(4'-tolyl)-3-methyl-pyrazolone or 25.5 parts of 1-(3'.4'-dichlorophenyl)-3-methyl-pyrazolone.

2-aminobenzoic acid-4-chloromethyl sulphone can be produced in the following manner:

Condensation of p-toluene-sulphinic acid with dichloracetic acid at 95° in a weakly phenolphthalein alkaline aqueous medium and simultaneous splitting off of HCl and $CO_2$ to form p-toluene-chloromethyl sulphone of the formula:

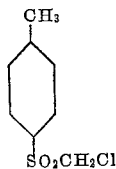

M. P. 80–81° (crystallised from alcohol).

Starting from this compound, the end product, 2-amino-benzoic acid-4-chloromethyl sulphone (M. P. 209–211°), is obtained by nitration in concentrated sulphuric acid, reduction with iron and HCl in water, acetylation of the amino group, oxidation of the methyl group with $KMnO_4$ in aqueous solution and finally saponification of the acetyl group with aqueous NaOH by way of the intermediate products: 3-nitro-4-methylbenzene-chloromethyl sulphone, M. P. 79–81°, 3-amino-4-methylbenzene-chloromethyl sulphone, M. P. 67–68°, 3-acetylamino-4-methylbenzene-chloromethyl sulphone, M. P. 154–156°, 2-acetylamino-benzoic acid-4-chloromethyl sulphone M. P. 231–232°.

Example 2

To produce the chromium complex compound of the dyestuff according to Example 1, on completion of the coupling the reaction mixture obtained according to the directions given therein is then diluted with 400 parts of water. 130 parts of a solution of ammonium chromosalicylate (containing 3.12 parts of chromium) are added, the whole is heated for 2 hours at 80° and for a further 2 hours at 100° and then kept boiling for another 4 hours. The dyestuff is then precipitated by the addition of sodium chloride, filtered off and dried.

The chromed dyestuff, which it is advantageous to mix with trisodium phosphate and a dispersing agent before use, is a yellow powder. It dyes wool from a neutral or weakly acetic acid bath a reddish yellow shade and the dyeings are distinguished by very good fastness to light, milling, washing and sea water.

In a similar manner the dyestuffs obtained according to Example 1 from 25 parts of 2-aminobenzoic acid-4-chloromethyl sulphone and 21.9 parts of 1-(4'-chlorophenyl)-3-methyl-pyrazolone, 20 parts of 1-(4'-tolyl)-3-methyl-pyrazolone or 25.5 parts of 1-(3'.4'-dichlorophenyl)-3-methyl-pyrazolone can be chromed in substance.

Chromium containing dyestuffs are then obtained which are very similar to that described above.

Example 3

22.15 parts of 1-hydroxy-2-aminobenzene-4-chloromethyl sulphone are mixed in 150 parts of water with 17 parts of concentrated hydrochloric acid, the mixture is cooled to 3° and diazotised with 6.9 parts of sodium nitrate in 50 parts of water. The greater part of the diazonium compound precipitates in the form of yellowish crystals. The reaction is made neutral with a little sodium bicarbonate and then a solution of 18.1 parts of acetoacetic acid anilide in 105 parts by volume of N-caustic soda lye and 12 parts of soda in 100 parts of water is added. On completion of the coupling, the dyestuff is precipitated at 50° by means of sodium chloride.

It is advantageous to mix the dyestuff with about 10% of anhydrous soda and 5% of a dispersing agent for use in the single or after chroming bath method. The dyestuff is a brownish yellow powder which dyes wool in the after chroming bath and in the single chroming bath method both with or without the slightest addition of acid in equal nuances and strengths of golden yellow shades.

To chrome the dyestuffs in substance, the filter cakes are pasted with 1000 parts of water and 10 parts of 25% ammonia, 100 parts by volume of a solution of ammonium disalicylatochromiate (containing 3% Cr) are added and the whole is heated for 6–10 hours at 90–100°. After the addition of 100 parts of sodium chloride the chromed dyestuff is filtered off at 50°, washed with a 5% sodium chloride solution and dried. The chromium complex dyestuff so obtained, which for use is mixed with 5–10% of both trisodium phosphate and a dispersing agent, is a brown-yellow powder. It dyes wool from a neutral or from a weakly acid bath a golden yellow shade. The dyeings have very good fastness properties.

Example 3A

The metal free o.o'-dihydroxyazo dyestuff produced according to Example 3 is heated for some hours at 80–85° in 800 parts of water with 100 parts of a cobalt acetate solution (corresponding to 3.6 parts of Co), until the starting dyestuff has disappeared. The reaction is then made alkaline by the addition of sodium carbonate and the whole is then heated for a further hour at 80–85°. The cobalt containing dyestuff is precipitated by the addition of sodium chloride, filtered off and dried. It is a yellow-brown powder which dyes wool from a weakly acid or a neutral bath in yellow shades which have good fastness to light.

If in the above example, the o.o'-dihydroxyazo dyestuff is replaced by dyestuffs which are obtained by coupling 22.2 parts of diazotised 1-hydroxy-2-aminobenzene-4-chloromethyl sulphone and 21.9 parts of acetoacetic acid-2'-chloranilide, 21.9 parts of acetoacetic acid-3'-chloranilide or 21.9 parts of acetoacetic acid-4'-chloranilide, and they are metallised as described, dyestuffs are obtained which have a somewhat better drawing power from a neutral bath.

Example 4

22.15 parts of 1-hydroxy-2-aminobenzene-4-chloromethyl sulphone are diazotised as described in Example 3. After the diazonium suspension has been neutralised with a little sodium bicarbonate, a solution of 21 parts of 1-(3'-chlorophenyl)-3-methyl-pyrazolone in 105 parts by volume of N-caustic soda lye and 100 parts of water which has been cooled to 3° is added. On completion of the coupling, the dyestuff is isolated by the addition of a little sodium chloride.

For use in the after chroming or the single bath chroming method, the dyestuff is mixed with 10% of anhydrous soda and 5% of a dispersing agent after it has been dried. It is an orange coloured powder and it dyes wool from an acid bath a yellow shade, which on after chroming changes to red-orange. In the single bath chroming method, equal red orange dyeings of the same strength are obtained with or without the slightest addition of acid. The dyebath is completely exhausted. The dyeings have very good wet and light fastness properties.

Similar dyestuffs are obtained if in the above example the coupling component is replaced by 28.5 parts of 1-phenyl-3-methyl-pyrazolone-3'-sulphodimethylamide by 27 parts of 1-phenyl-3-methyl-pyrazolone-3'-sulphomethyl-amide or by 21 parts of 1-(4'-chlorophenyl)-3-methyl-pyrazolone.

To chrome the dyestuff in substance, the filter cakes are pasted with 1000 parts of water and 10 parts of 25% ammonia, 100 parts by volume of a solution of ammonium disalicylatochromiate (containing 3% Cr) are added and the whole is heated for 6–10 hours at 90–100°. The chromium complex compound of the dyestuff so formed is then precipitated by the addition of 100 parts of sodium chloride, filtered off at 50°, washed with a 10% sodium chloride solution and dried. It is mixed with 10% of trisodium phosphate and 5% of a dispersing agent for use. The metallised dyestuff is a red-orange powder and it dyes wool from a neutral or weakly acid bath a red-orange shade. The dyeings have very good wet and light fastness properties.

The dyestuffs obtained from 1-phenyl-3-methyl-pyrazolone-3'-sulphodimethylamide and -3'-sulphomethylamide or 1-(4'-chlorophenyl)-3-methyl-pyrazolone can also be chromed in the same way. Chromium complex dyestuffs are then obtained which are similar to that described above.

Example 5

22.15 parts of 1-hydroxy-2-aminobenzene-4-chloromethyl sulphone are diazotised as described in Example 3. After neutralising the diazonium suspension with a little sodium bicarbonate, 24.5 parts of 1-(3'-chlorophenyl)-pyrazolone-3-carboxylic acid amide dissolved in 105 parts by volume of N-caustic soda lye, 100 parts of water and 100 parts of ethyl alcohol are added at 0–5°. After half an hour, 5 parts of 25% ammonia are added whereupon the coupling is complete in about 1 hour. The dyestuff is then precipitated by the addition of 30 parts of sodium chloride, filtered off and washed with a 5% sodium chloride solution.

The dried dyestuff is mixed with 15% of anhydrous soda and 5% of a dispersing agent for use in the after chroming or single bath chroming method. The dyestuff is a yellowish red powder which dyes wool from an acid bath a yellow shade which changes to red on after chroming. In the single bath chroming method the same shade of reddish-blue dyeings of equal strength are obtained with or without the slightest addition of acid.

Similar dyestuffs are obtained if in the above example, the coupling component is replaced by 21 parts of 1-phenyl-pyrazolone-3-carboxylic acid amide or 22.5 parts of 1-phenyl-pyrazolone-3-carboxylic acid methylamide.

To chrome the dyestuff in substance, the filter cakes are pasted with 1000 parts of water and 10 parts of 25% ammonia, 100 parts by volume of a solution of ammonium disalicylatochromiate (containing 3% Cr) are added and the whole is heated for 6–10 hours at 90–100°. The chromium complex formed is precipitated on the addition of 100 parts of sodium chloride and filtered off at 70°. The dyestuff is mixed with 10% of trisodium phosphate and 5% of a dispersing agent for use. It is a red powder which dyes wool from a neutral or weakly acid bath a bluish red shade. The dyeings have very good wet and light fastness properties.

The dyestuffs obtained from 1-phenyl-pyrazolone-3-carboxylic acid amide or from 1-phenyl-pyrazolone-3-carboxylic acid methylamide can also be chromed in substance in the same manner whereupon chromium complex dyestuffs are obtained which are similar to that described above.

Example 6

22.15 parts of 1-hydroxy-2-aminobenzene-4-chloromethyl sulphone are diazotised as described in Example 3 and after neutralising the diazonium suspension with sodium bicarbonate, a solution of 19.5 parts of 1.7-formyl-aminonaphthol in 105 parts by volume of N-caustic soda lye and 200 parts of water is added. 10 parts of 25% ammonia are added at 3° after which the coupling is complete after 4–5 hours. The dyestuff is then precipitated with 40 parts of sodium chloride, filtered off and washed with a 5% sodium chloride solution.

The dried dyestuff is mixed with 15% of anhydrous soda and 5% of a dispersing agent for use in the after chroming and single bath chroming method. The dyestuff is a dark grey powder which dyes wool from an acid bath a red shade which changes to grey on after chroming. In the single bath chroming process the same shade of grey dyeings of equal strength are obtained with or without the slightest addition of acid. The dyeings have good wet and light fastness properties.

Similar dyestuffs are obtained if in the above example the coupling component is replaced by 21.1 parts of 1.7-acetylaminonaphthol or 22.8 parts of 1.7-carbomethoxy-aminonaphthol.

To chrome the dyestuff in substance, the filter cakes are pasted with 1000 parts of water and 10 parts of 25% ammonia, a solution of ammonium disalicylatochromiate (containing 3% Cr) is added and the whole is heated for 6–10 hours at 90–100°. The chromium complex formed is precipitated by the addition of 120 parts of sodium chloride and filtered off at 70°. The dyestuff is mixed with 10% of anhydrous soda and 5% of a dispersing agent for use. It is a dark grey powder which dyes wool from a neutral or weakly acid bath a grey shade which has very good fastness to wet and light.

The dyestuffs obtained according to the above with 1.7-acetyl- or with 1.7-carbomethoxy-aminonaphthol can also be chromed in the same manner whereupon chromium complex dyestuffs are obtained which are similar to that described above.

Example 7

26.7 parts of 6-nitro-2-amino-1-hydroxybenzene-4-chloromethyl sulphone are dissolved in 150 parts of water and 120 parts by volume of N-caustic soda lye, mixed with a solution of 6.9 parts of sodium nitrite in 20 parts of water and then the whole is added dropwise to 220 parts of water and 30 parts of hydrochloric acid during which addition the temperature should not exceed 5°. On completion of the diazotisation, the diazonium suspension is neutralized with a little sodium bicarbonate and a solution of 14.5 parts of β-naphthol and 4.2 parts of sodium hydroxide in 200 parts of water is added. The temperature of the coupling mixture is kept for 2–3 hours at 3–5° after which it is slowly raised to 20°. The dyestuff is precipitated by the addition of 50 parts of sodium chloride, filtered off, washed and dried. It is a dark grey-violet powder which dyes wool from an acid bath a red shade; on after chroming this changes to reddish-grey. In the single bath chroming process grey dyeings of equal shade and strength are obtained with or without the slightest addition of acid. The dyeings have very good wet and light fastness properties.

Similar dyestuffs are obtained if in the above example the coupling component is replaced by 22.5 parts of 2.6-naphtholsulphamide or 24 parts of 2.6-naphtholsulphomethylamide, by 34 parts of 1.3.6-naphtholdisulphomethylamide or 21.1 parts of 1.7-acetylaminonaphthol or 22.8 parts of 1.7-carbomethoxy-aminonaphthol.

To chrome the dyestuff in substance the filter cakes are pasted with 1000 parts of water and 10 parts of 25% ammonia, 100 parts by volume of a solution of ammonium disalicylatochromiate (containing 3% Cr) are added and the whole is heated for 6–10 hours at 90–100°. The chromium complex formed is precipitated by the addition of 80 parts of sodium chloride and filtered off at 60°. The dyestuff is mixed with 10% of both trisodium phosphate and a dispersing agent for use. It is a dark grey powder which dyes wool from a neutral or weakly acid bath a reddish-grey shade. The dyeings have very good wet and light fastness properties.

6-nitro-2-amino-1-hydroxybenzene-4-chloromethyl sulphone is obtained from 1-hydroxy-2-aminobenzene-4-chloromethyl sulphone by nitrating with a mixture of equal parts of nitric acid and concentrated sulphuric acid in concentrated sulphuric acid. M. P. 186° (crystallised from glacial acetic acid).

Example 8

10 parts of wool are entered at 50° into a dyebath made up from 400 parts of water, 1 part of anhydrous sodium sulphate, 0.2 part of sodium monochromate, 0.3 part of ammonium sulphate and 0.2 part of the unchromed dyestuff according to Example 4. The bath is brought to the boil and kept boiling for an hour until the shade has fully developed. The wool which has been dyed red-orange, is rinsed and dried.

Example 9

10 parts of wool are entered at 40° into a dyebath made up from 400 parts of water, 0.2 part of the dyestuff chromed in substance according to Example 6, 1 part of anhydrous sodium sulphate and 0.3 part of ammonium acetate. The whole is boiled until the liquor is exhausted, which is for about one hour. The wool which has been dyed a strong grey, is rinsed and dried.

Further valuable dyestuffs which can be produced according to the preceding Examples 1-7 are listed in the following table.

| | Diazocomponent | Coupling component | Colour of the metal complex compound on wool |
|---|---|---|---|
| 1 | 1-hydroxy-2-aminobenzene-4-chloromethyl sulphone. | 1-phenyl-3-methylpyrazolone. | red-orange (Cr). |
| 2 | ___do___ | 2.4-dihydroxyquinoline. | red (Cr). |
| 3 | ___do___ | 1.3-dihydroxyisoquinoline. | pink (Cr). |
| 4 | ___do___ | 3-methyl-pyrazolone. | scarlet (Cr). |
| 5 | ___do___ | 3-acetylamino-4-methyl phenol. | red-brown (Cr). |
| 6 | ___do___ | 4-methyl phenol. | brown (Cr). |
| 7 | ___do___ | β-naphthol. | violet (Cr). |
| 8 | ___do___ | ___do___ | bordeaux (Co). |
| 9 | ___do___ | 2.6-naphtholmethyl sulphone. | violet (Cr). |
| 10 | ___do___ | 2.6-naphtholsulphomethylamide. | Do. |
| 11 | 1-hydroxy-2-amino-4-methyl-6-nitrobenzene. | 1-phenyl-3-methylpyrazolone-3'-chloromethyl sulphone. | blue-red (Cr). |
| 12 | 1-hydroxy-2-amino-6-nitrobenzene-4-chloromethyl sulphone. | 1-phenyl-3-methylpyrazolone. | red-orange (Cr). |
| 13 | 2-aminobenzoic acid-4-chloromethyl sulphone. | β-naphthol. | brown-red (Cr). |
| 14 | ___do___ | 1.7-acetylaminonaphthol. | violet-brown (Cr). |
| 15 | 1-hydroxy-2-aminobenzene-4-chloromethyl sulphone. | 1-(3'-chlorophenyl)-3-methylpyrazolone. | brownish-yellow (Co). |
| 16 | ___do___ | 1-(3-chlorophenyl)-pyrazolone-3-carboxylic acid amide. | yellow-brown (Co). |
| 17 | ___do___ | 1.7-formylaminonaphthol. | brown-violet (Co). |
| 18 | 1-hydroxy-2-amino-6-nitrobenzene-4-chloromethyl sulphone. | 1.7-acetylaminonaphthol. | grey (Co). |
| 19 | ___do___ | 1-(3'-chloromethyl-sulphonyl-phenyl)-3-methyl-pyrazolone. | brownish-orange (Cr). |
| 20 | 1-hydroxy-2-aminobenzene-4-chloromethyl sulphone. | ___do___ | orange (Cr). |
| 21 | ___do___ | ___do___ | reddish-yellow (Co). |
| 22 | ___do___ | 1-phenyl-3-methyl-5-pyrazolone. | Do. |
| 23 | ___do___ | 1-(4'-chlorophenyl)-3-methyl-5-pyrazolone. | Do. |
| 24 | ___do___ | ___do___ | orange (Cr). |

What we claim is:

1. The complex heavy metal compound of a monoazo dyestuff having the general formula:

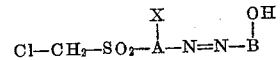

wherein:

A represents a benzene nucleus,
B represents the radical of a member selected from the group consisting of phenolic, naphtholic and enolic coupling components, containing the OH-group in o-position to the azo group, and
X represents a metallisable group in o-position to the azo group selected from the group consisting of OH and COOH, A and B being otherwise free from carboxylic acid and sulphonic acid groups.

2. The complex heavy metal compound of a monoazo dyestuff having the general formula:

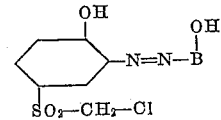

wherein:

B represents the radical of a member selected from the group consisting of phenolic, naphtholic and enolic coupling components, containing the OH-group in o-position to the azo group, which is otherwise free from carboxylic acid and sulphonic acid groups.

3. The complex chromium compound of a monoazo dyestuff having the formula:

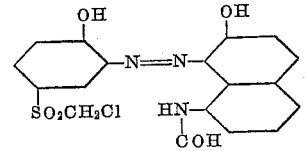

4. The complex chromium compound of a monoazo dyestuff having the formula:

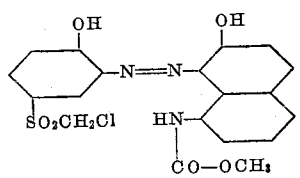

5. The complex cobalt compound of a monoazo dyestuff having the formula:

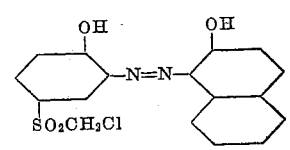

6. The complex chromium compound of a monoazo dyestuff having the formula:

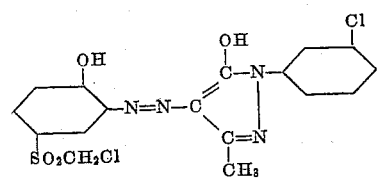

7. The complex chromium compound of a monoazo dyestuff having the formula:
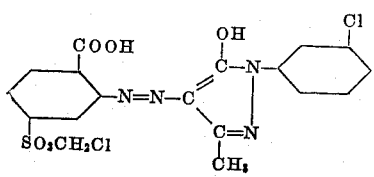
References Cited in the file of this patent
UNITED STATES PATENTS
| | | |
|---|---|---|
| 2,434,150 | Dickey et al. | Jan. 6, 1948 |
| 2,551,056 | Schetty | May 1, 1951 |
| 2,610,175 | Widmer et al. | Sept. 9, 1952 |
| 2,730,522 | Schetty et al. | Jan. 10, 1956 |